US012585073B2

(12) United States Patent
Petersen

(10) Patent No.: US 12,585,073 B2
(45) Date of Patent: Mar. 24, 2026

(54) MULTI-FIBER FIBER OPTIC CONNECTOR ASSEMBLY WITH A SNAP-IN MULTI-FIBER FERRULE DUST CAP

(71) Applicant: CommScope Technologies LLC, Hickory, NC (US)

(72) Inventor: Cyle D. Petersen, Belle Plaine, MN (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 372 days.

(21) Appl. No.: 18/006,268

(22) PCT Filed: Jul. 21, 2021

(86) PCT No.: PCT/US2021/042604
§ 371 (c)(1),
(2) Date: Jan. 20, 2023

(87) PCT Pub. No.: WO2022/020491
PCT Pub. Date: Jan. 27, 2022

(65) Prior Publication Data
US 2023/0305238 A1        Sep. 28, 2023

Related U.S. Application Data

(60) Provisional application No. 63/056,213, filed on Jul. 24, 2020.

(51) Int. Cl.
*G02B 6/38*        (2006.01)
*G02B 6/40*        (2006.01)

(52) U.S. Cl.
CPC ......... *G02B 6/3849* (2013.01); *G02B 6/3831* (2013.01); *G02B 6/3893* (2013.01); *G02B 6/403* (2013.01); *G02B 6/3885* (2013.01)

(58) Field of Classification Search
CPC .... G02B 6/3885; G02B 6/403; G02B 6/3893; G02B 6/3831; G02B 6/3849
See application file for complete search history.

(56) References Cited

U.S. PATENT DOCUMENTS

| | | | |
|---|---|---|---|
| 8,262,294 B2 | 9/2012 | Marcouiller et al. | |
| 8,374,478 B2 | 2/2013 | Marcouiller et al. | |
| 9,823,425 B2 | 11/2017 | Xiao et al. | |
| 10,175,427 B2 * | 1/2019 | Cloud .................. | G02B 6/3849 |

(Continued)

FOREIGN PATENT DOCUMENTS

| | | |
|---|---|---|
| EP | 3306367 A1 | 4/2018 |
| WO | 2018119140 A1 | 6/2018 |

OTHER PUBLICATIONS

International Search Report for International Patent Application No. PCT/US2021/042604 mailed.

*Primary Examiner* — Thomas A Hollweg
*Assistant Examiner* — Marc E Manheim
(74) *Attorney, Agent, or Firm* — Merchant & Gould P.C.

(57) ABSTRACT
Aspects and techniques of the present disclosure relate to a multi-fiber ferrule dust cap for use on a multi-fiber fiber optic connector. The multi-fiber ferrule dust cap is configured to cover an end face of a multi-fiber ferrule to protect ends of optical fibers mounted within the multi-fiber ferrule from contamination and/or damage. No portion of the multi-fiber ferrule dust cap covers a connector body of the multi-fiber fiber optic connector.

20 Claims, 13 Drawing Sheets

(56)  References Cited

U.S. PATENT DOCUMENTS

| | | | |
|---|---|---|---|
| 10,185,102 B2 | 1/2019 | Sawicki et al. | |
| 2011/0188813 A1* | 8/2011 | Marcouiller ......... | G02B 6/3849 |
| | | | 385/139 |
| 2015/0277062 A1* | 10/2015 | Xiao .................... | G02B 6/3849 |
| | | | 385/139 |
| 2018/0095226 A1* | 4/2018 | Watanabe ............ | G02B 6/3885 |
| 2018/0329150 A1* | 11/2018 | Chang ................. | G02B 6/3849 |
| 2020/0333537 A1* | 10/2020 | Gniadek ............. | G02B 6/3893 |

* cited by examiner

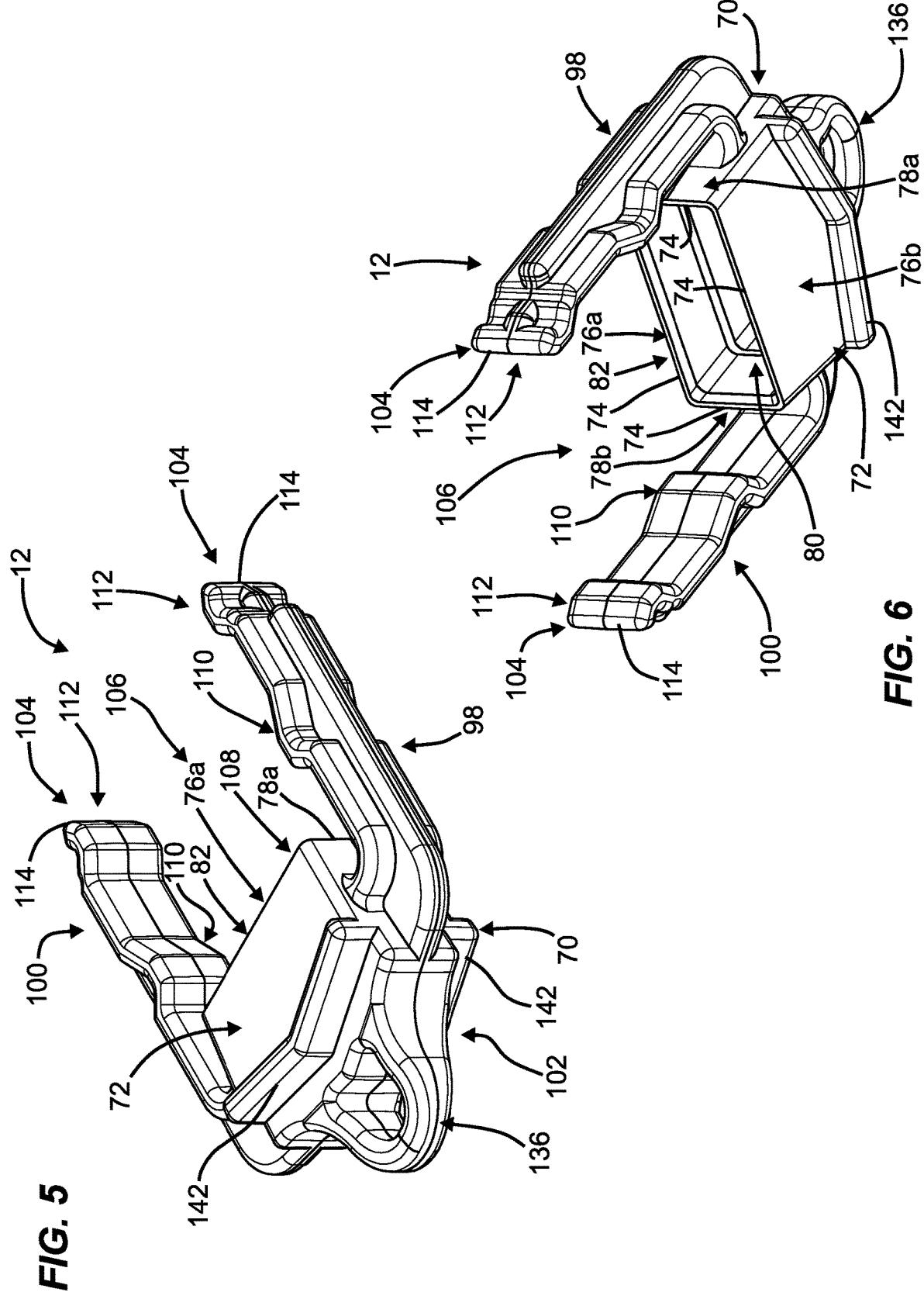

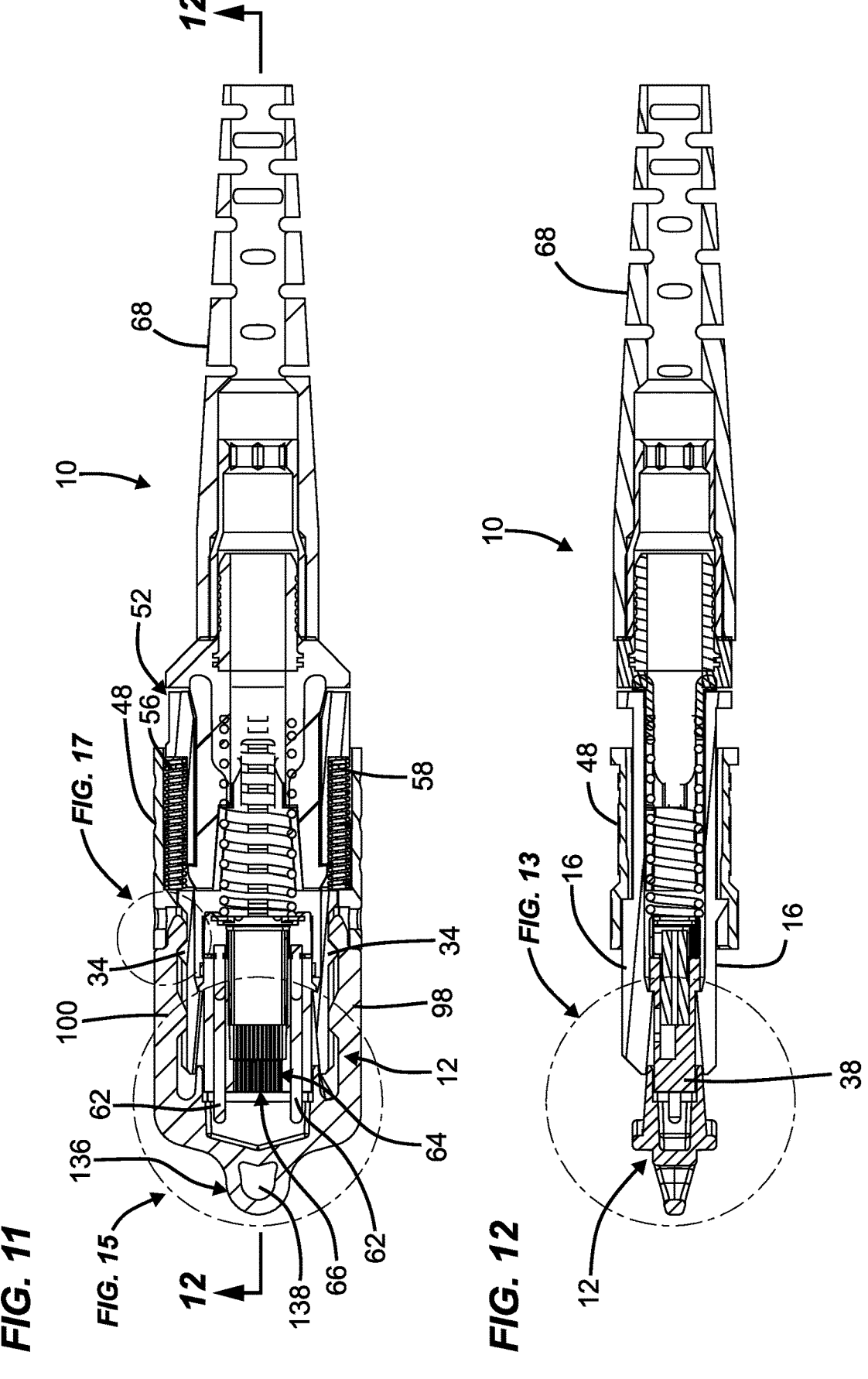

MULTI-FIBER FIBER OPTIC CONNECTOR ASSEMBLY WITH A SNAP-IN MULTI-FIBER FERRULE DUST CAP

CROSS-REFERENCE TO RELATED APPLICATION

This application is a national stage entry of PCT International Patent Application PCT/US2021/42604 filed on Jul. 21, 2021 and claims the benefit of U.S. Patent Application Ser. No. 63/056,213, filed on Jul. 24, 2020, the disclosure of which is incorporated herein by reference in its entirety.

TECHNICAL FIELD

The present disclosure is generally related to a multi-fiber fiber optic connector assembly, and more specifically, to a dust-proof multi-fiber fiber optic connector.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

To facilitate installation and connection to various telecommunications equipment, the fiber optic cables are often connectorized. In particular, one or both ends of the fiber optic cable may include a fiber optic connector. The fiber optic connector may connect to various telecommunications equipment, including other fiber optic cables. The fiber optic connector may support and position ends of optical fibers (e.g., within a ferrule of the fiber optic connector). The ends of the optical fibers may abut ends of other optical fibers and thereby form an optical connection from fiber to fiber.

Prior to connection (e.g., during installation) and during periods of disconnection (e.g., during maintenance, reconfiguration, etc.), the ends of the optical fibers may be exposed. Exposure of the ends of the optical fibers is undesired as they may be subjected to contamination and/or damage. Dust caps have been developed to protect the fiber optic connector, and in particular the ferrule and fibers supported therein, from contamination when disconnected.

While dust caps have been used to protect ends of optical fibers and/or an end of a fiber optic connector from contamination and/or damage, improvements are desirable in this area.

SUMMARY

Aspects of the present disclosure relate to a multi-fiber ferrule dust cap that is configured to cover an end face of a multi-fiber ferrule to protect ends of optical fibers mounted within the multi-fiber ferrule from contamination and/or damage.

The multi-fiber ferrule dust cap can be mounted on a multi-fiber fiber optic connector by a snap-fit connection to help prevent the multi-fiber ferrule dust cap from falling off during installation and/or packaging.

One aspect of the present disclosure relates to a multi-fiber fiber optic connector assembly. The multi-fiber fiber optic connector can have a connector body with first and second major sides, first and second minor sides, a front end, and a rear end. The first and second minor sides can each define a latching recess, a main recess and a projecting snap-fastening catch positioned between the latching recess and the main recess. At least one of the first and second major sides of the connector body can include a key component.

The multi-fiber fiber optic connector assembly can include a multi-fiber ferrule positioned at the front end of the connector body. The multi-fiber ferrule can have two major sides, two minor sides, and a distal end face. The multi-fiber ferrule can define a plurality of bore openings through the distal end face.

The multi-fiber fiber optic connector assembly can also include a plurality of optical fibers that extend through respective bore openings such that end portions of the plurality of optical fibers are positioned at the distal end face of the multi-fiber ferrule.

The multi-fiber fiber optic connector assembly can further include a release sleeve that can be slidingly mounted over the connector body. The release sleeve can be slidable between a latch retaining position and a latch releasing position on the connector body.

The multi-fiber fiber optic connector assembly can include a dust cap. The dust cap can include a main body that forms a sleeve where the sleeve includes a plurality of walls that define two major sides and two minor sides. When the dust cap is installed on the multi-fiber fiber optic connector, the sleeve can be configured to mount between the connector body and the multi-fiber ferrule such that the two major sides of the sleeve engage the two major sides of the multi-fiber ferrule and the two minor sides of the sleeve engage the two minor sides of the multi-fiber ferrule.

The dust cap can include first and second latching arms respectively integrated with the sleeve on the two minor sides thereof. The first and second latching arms can each include a latching projection. When the dust cap is installed on the multi-fiber fiber optic connector, the first and second latching arms can extend along the first and second minor sides of the connector body such that the latching projections engage the latching recesses on the connector body. The first and second latching arms together define an open region that is defined between the first and second latching arms from a proximal end of the sleeve to a proximal end of the latching projection such that when the dust cap is installed on the multi-fiber fiber optic connector, no portion of the sleeve covers the first and second major sides of the connector body.

Another aspect of the present disclosure relates to a dust cap and a multi-fiber fiber optic connector. The dust cap and the multi-fiber fiber optic connector can include a connector body that has first and second major sides and first and second minor sides. The first and second minor sides can each define a latching recess, a main recess and a projecting snap-fastening catch positioned between the latching recess and the main recess. At least one of the first and second major sides of the connector body can include a key component.

The dust cap and the multi-fiber fiber optic connector can include a multi-fiber ferrule that mounts within the connector body. The multi-fiber ferrule has two major sides and two minor sides.

The dust cap and the multi-fiber fiber optic connector further includes a dust cap that includes a sleeve having two major sides and two minor sides. When the dust cap is installed on the multi-fiber fiber optic connector, the sleeve can be configured to mount between the connector body and the multi-fiber ferrule such that the two major sides of the sleeve engage the two major sides of the multi-fiber ferrule

3 and the two minor sides of the sleeve engage the two minor sides of the multi-fiber ferrule.

The dust can further include first and second latching arms respectively integrated with the sleeve on the two minor sides thereof. The first and second latching arms can each include a latching projection. When the dust cap is installed on the multi-fiber fiber optic connector, the first and second latching arms can extend along the first and second minor sides of the connector body such that the latching projections engage the latching recesses on the connector body. The first and second latching arms together define an open region that is defined between the first and second latching arms from a proximal end of the sleeve to a proximal end of the latching projection such that when the dust cap is installed on the multi-fiber fiber optic connector, no portion of the sleeve covers the first and second major sides of the connector body.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 illustrates a front perspective view of the dust cap of FIG. 1.

FIG. 6 illustrates a rear perspective view of the dust cap of FIG. 1.

FIG. 11 illustrates a cross-sectional view taken along section line 11-11 of FIG. 4.

FIG. 12 illustrates a cross-sectional view taken along section line 12-12 of FIG. 11.

4

Figures 15, 17, 18:
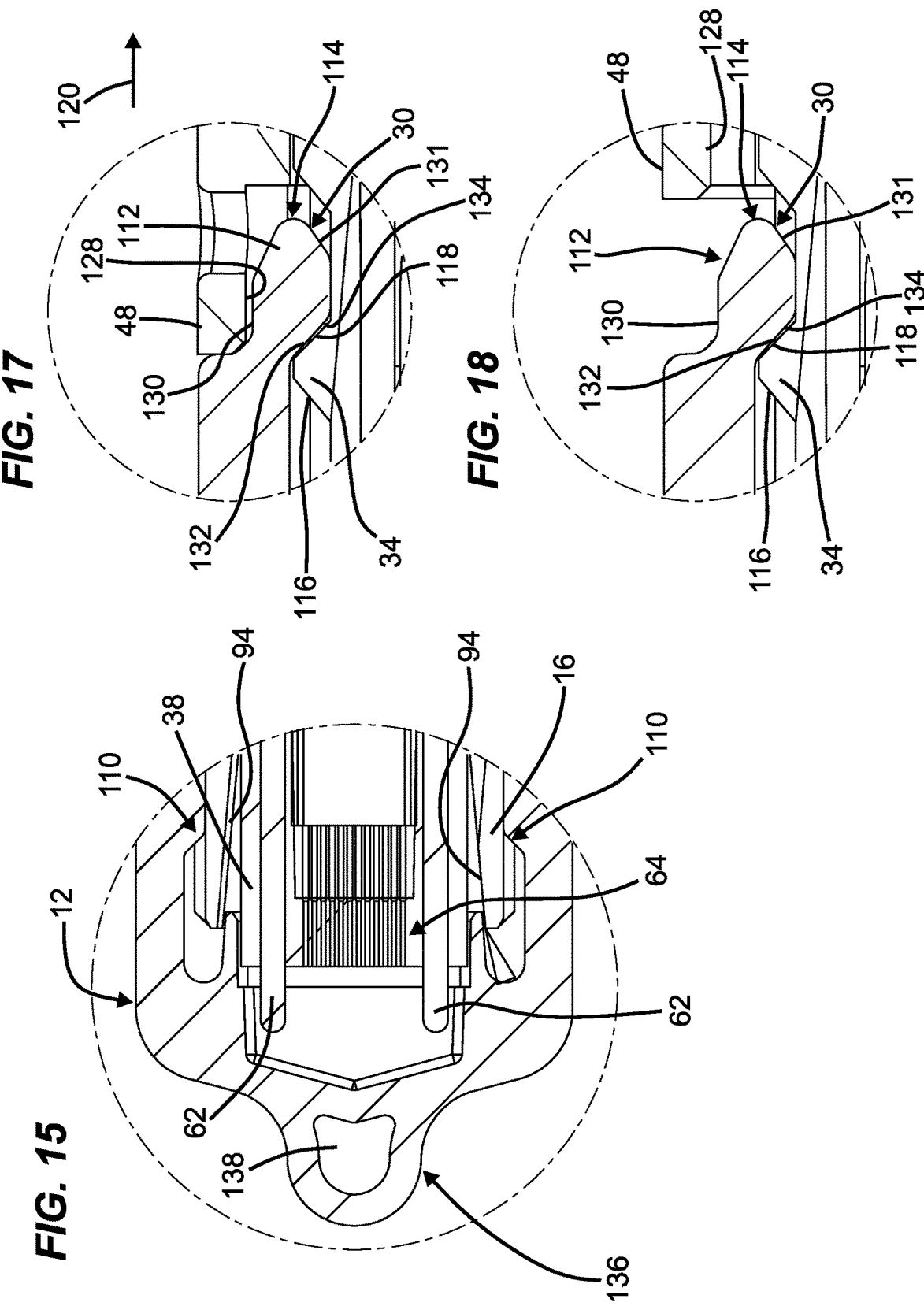
FIG. 15 illustrates an enlarged view of a portion of FIG. 11.
FIG. 17 illustrates an enlarged view of a portion of FIG. 11 and a release sleeve in a latch retaining position.

FIG. 18 illustrates the release sleeve of FIG. 17 in a latch releasing position.

Figure 1:
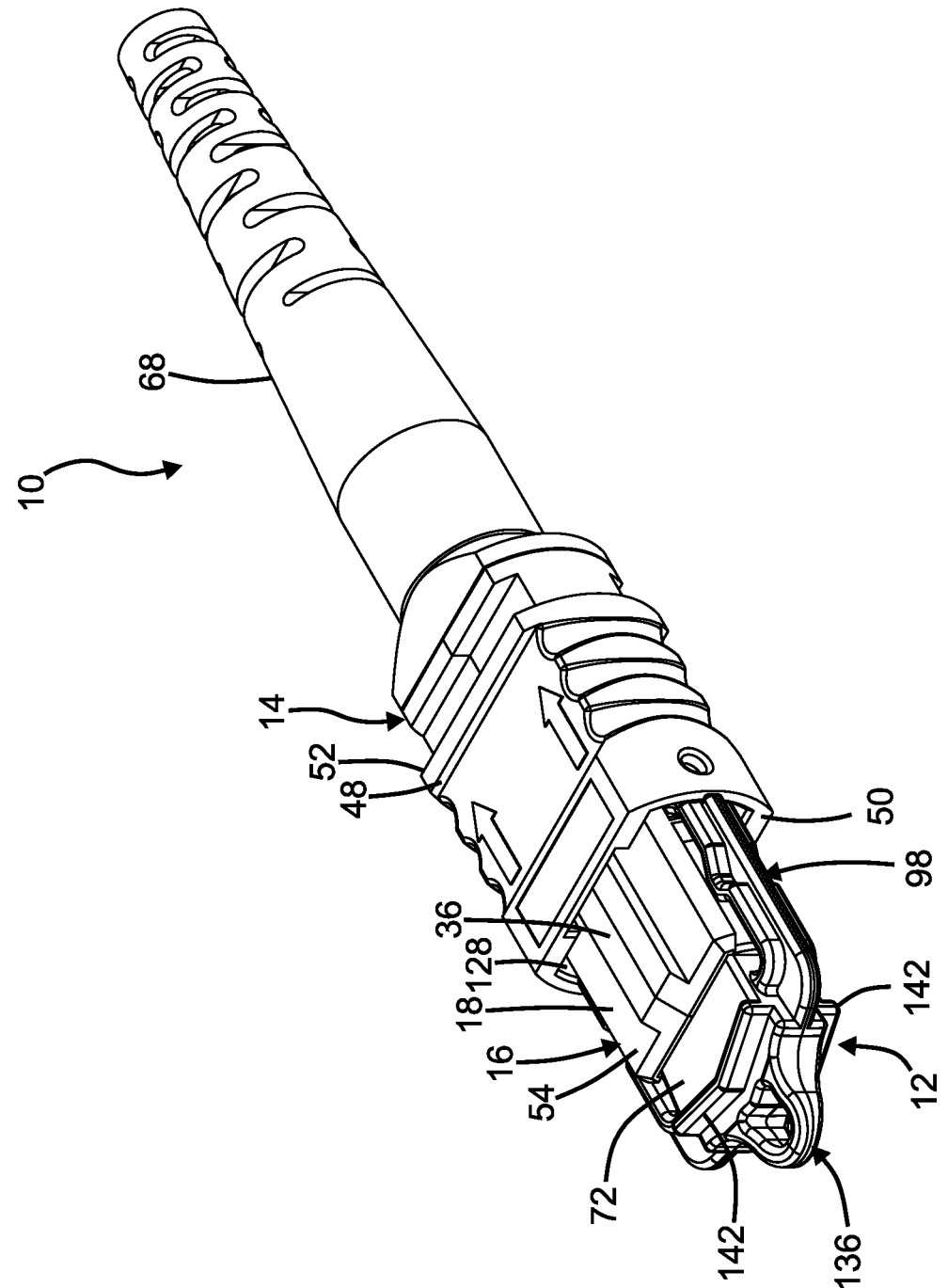
FIG. 1 illustrates a perspective view of a multi-fiber fiber optic connector assembly including a dust cap assembled on a multi-fiber fiber optic connector in accordance with principles of the present disclosure.
Figure 2:
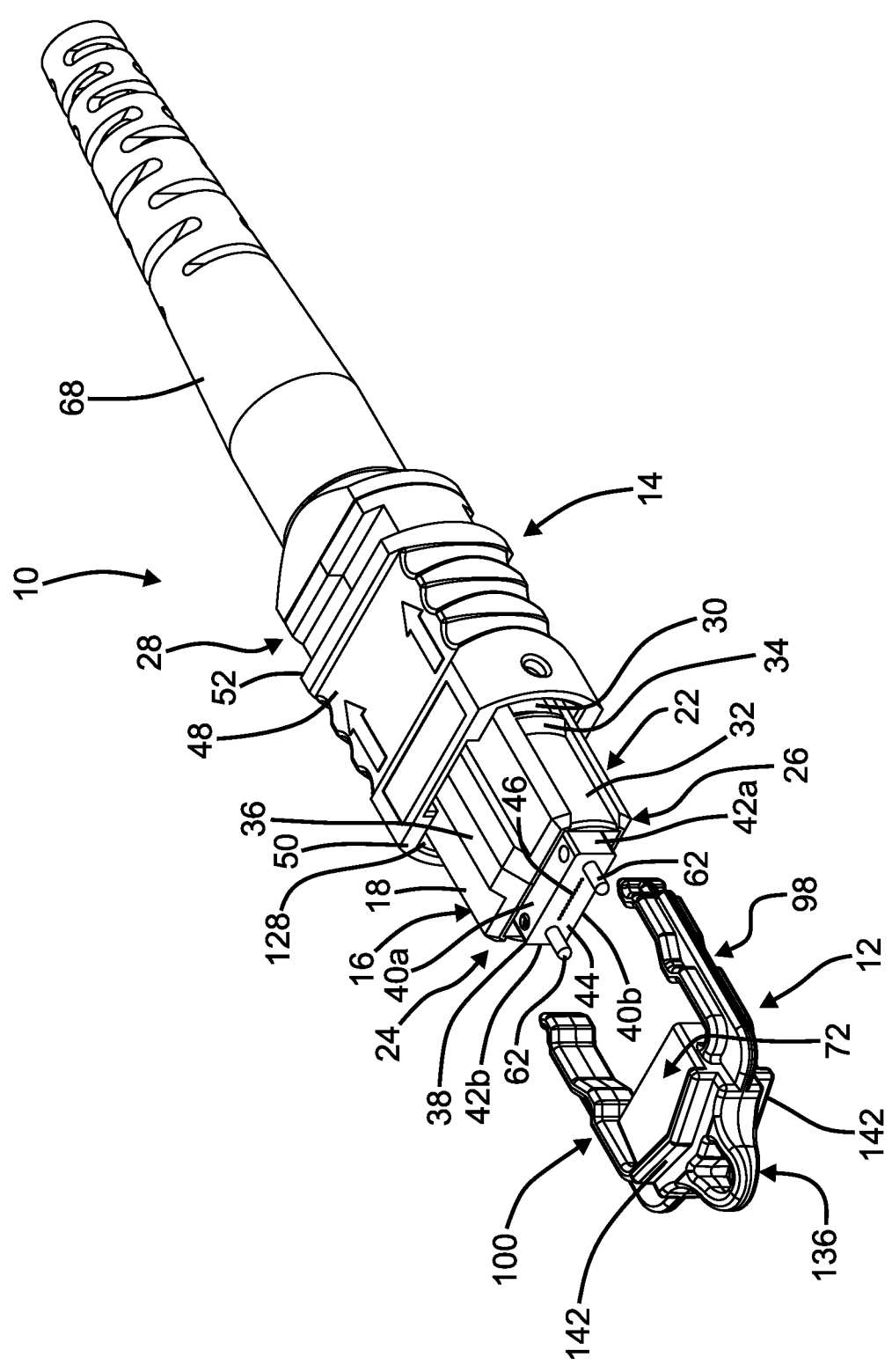
FIG. 2 illustrates a perspective view of the multi-fiber fiber optic connector assembly of FIG. 1 with the dust cap removed from the multi-fiber fiber optic connector.
Figures 3, 4:
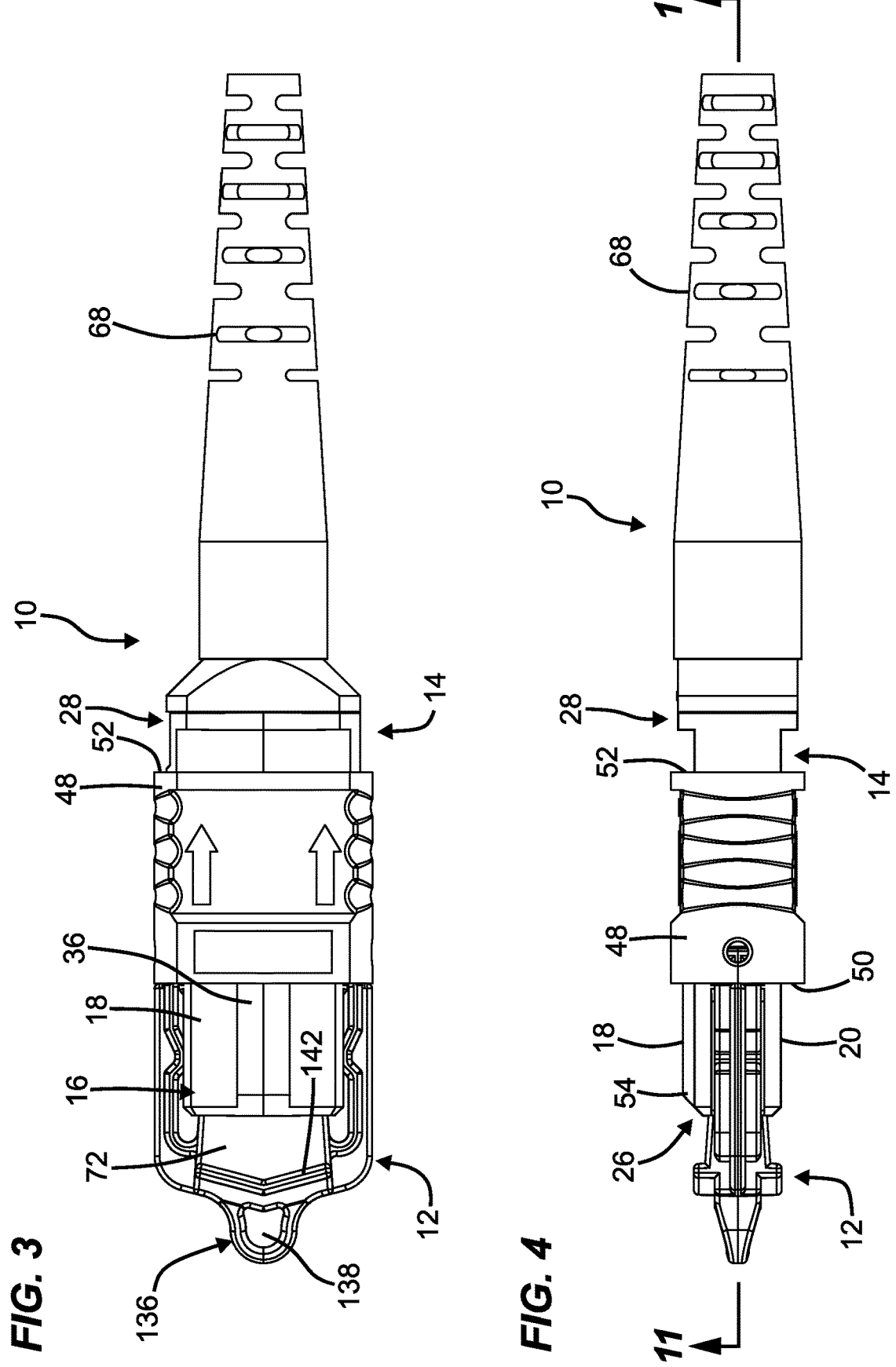
FIG. 3 illustrates a top view of the multi-fiber fiber optic connector assembly of FIG. 1.
FIG. 4 illustrates a side view of the multi-fiber fiber optic connector assembly of FIG. 1.
Figures 7, 8:
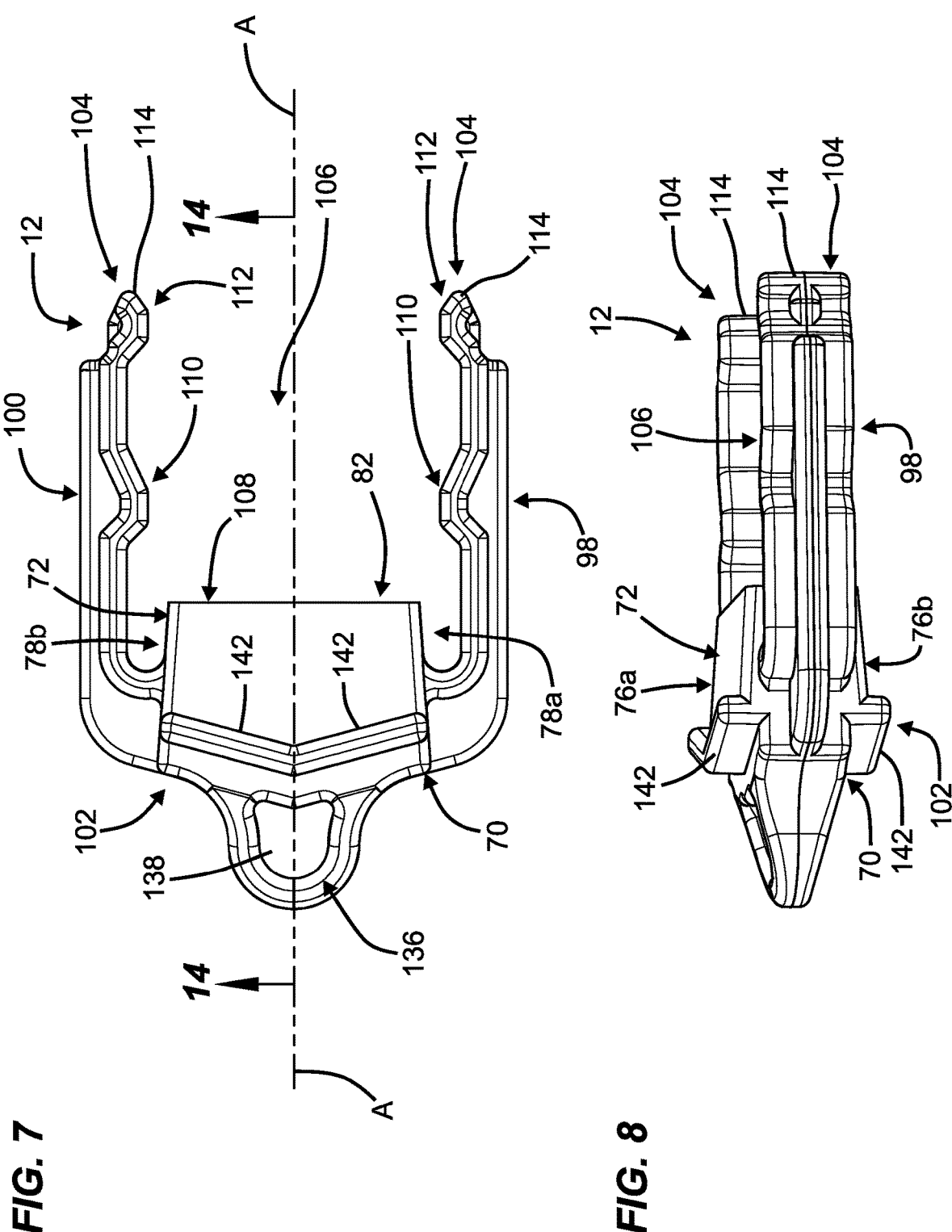
FIG. 7 illustrates a top view of the dust cap of FIG. 1.
FIG. 8 illustrates a side view of the dust cap of FIG. 1.
Figures 9, 10:
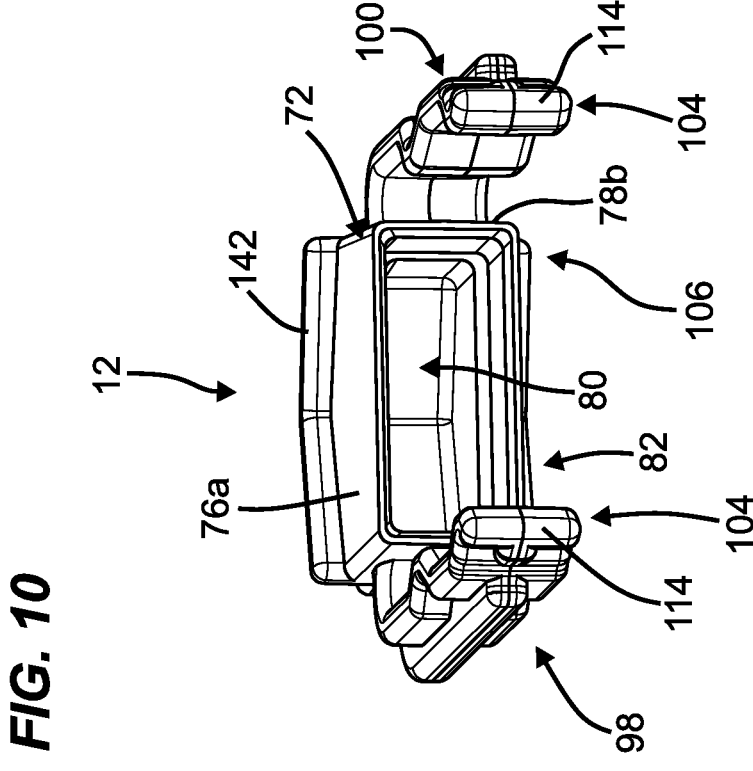
FIG. 9 illustrates a front view of the dust cap of FIG. 1.
FIG. 10 illustrates a rear view of the dust cap of FIG. 1.
Figure 19:
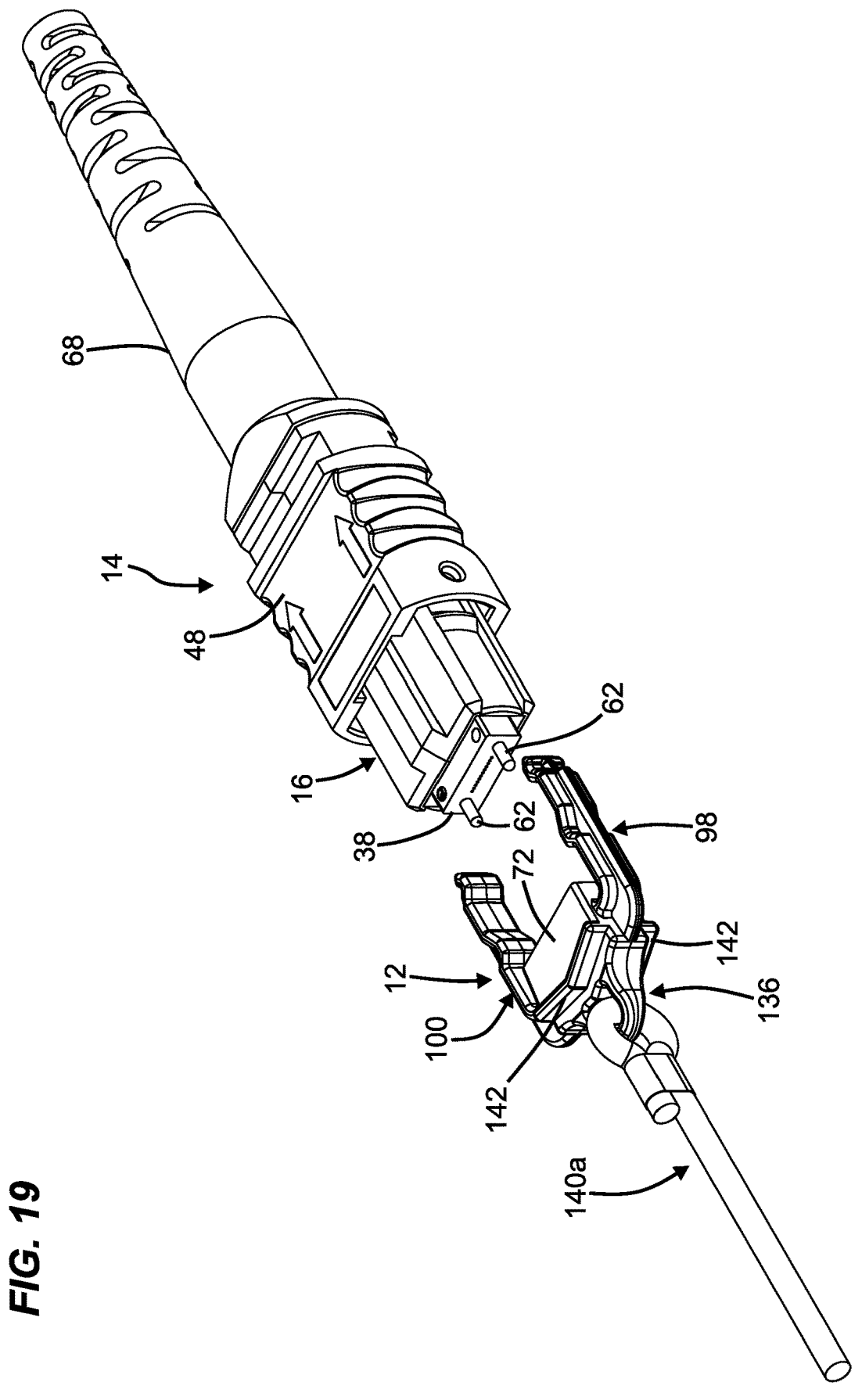

FIG. 19 illustrates the multi-fiber fiber optic connector assembly of FIG. 2 including a pulling strap.

Figure 20:
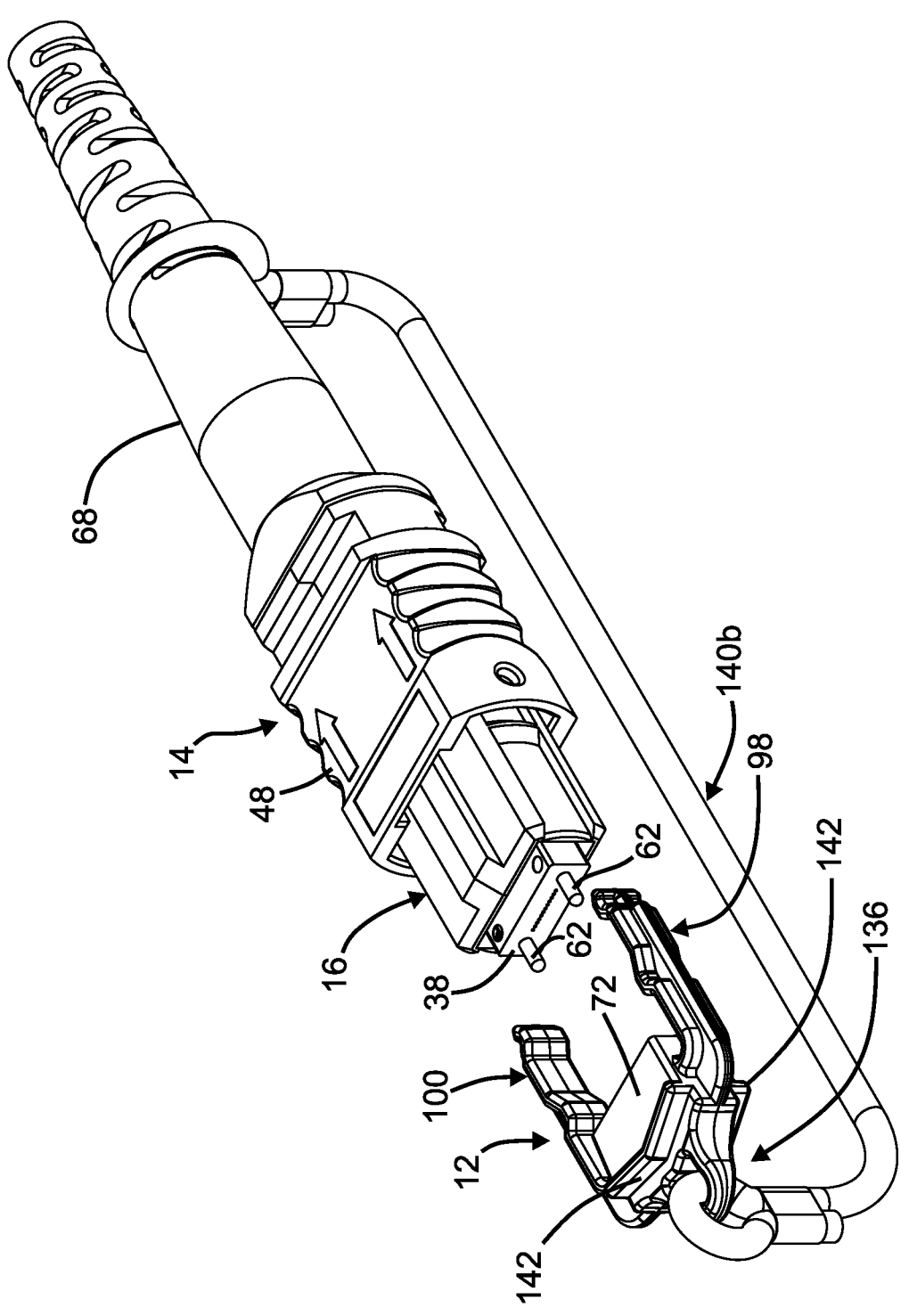

FIG. 20 illustrates the multi-fiber fiber optic connector assembly of FIG. 2 including a lanyard strap.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure relates to a multi-fiber ferrule dust cap for use on a multi-fiber fiber optic connector. The multi-fiber ferrule dust cap is configured to latch to latch receptacles of the multi-fiber fiber optic connector and is retained in a latched state by a release sleeve of the multi-fiber fiber optic connector. The multi-fiber ferrule dust cap has an open configuration so as to not cover/overlie major sides of a connector body of the multi-fiber fiber optic connector. The multi-fiber ferrule dust cap includes a sleeve that is configured to fit over an end face of a multi-fiber ferrule. When the multi-fiber ferrule dust cap is mounted, the sleeve can be configured to occupy regions between major sides of the multi-fiber ferrule and the major sides of the connector body. No portion of the multi-fiber ferrule dust cap covers the connector body of the multi-fiber fiber optic connector. The multi-fiber ferrule dust cap is configured to protect ends of optical fibers mounted within the multi-fiber ferrule from contamination and/or damage.

FIGS. 1-4 illustrate a multi-fiber fiber optic connector assembly 10 that includes a dust cap 12 in accordance with the principles of the present disclosure and a multi-fiber fiber optic connector 14 (e.g., a multi-fiber push on connector (MPO)) that is compatible with the dust cap 12.

The multi-fiber fiber optic connector 14 includes a connector body 16 with a first major side 18, an opposite and a second major side 20. The connector body 16 has a first minor side 22 and an opposite, second minor side 24, a front end 26, and a rear end 28. The first and second minor sides 22, 24 each define a latching recess 30, a main recess 32 and a projecting snap-fastening catch 34 positioned between the latching recess 30 and the main recess 32. At least one of the first and second major sides 18, 20 of the connector body 16 can include a key component 36.

A multi-fiber ferrule 38 can be mounted within the connector body 16. For example, the multi-fiber ferrule 38 can be positioned at the front end 26 of the connector body 16. The multi-fiber ferrule 38 can have two major sides 40a, 40b, two minor sides 42a, 42b and a distal end face 44. The multi-fiber ferrule 38 defines a plurality of bore openings 46 through the distal end face 44.

A release sleeve 48 can be slidingly mounted over the connector body 16. The release sleeve 48 extends from a first end 50 to a second end 52. The release sleeve 48 is positioned around an exterior portion 54 of the connector body 16 with the first end 50 nearer the front end 26 of the connector body 16 and the second end 52 nearer the rear end 28 of the connector body 16. The release sleeve 48 is slidable between a latch retaining position (see FIG. 17) and a latch releasing position (see FIG. 18) on the connector body 16. The release sleeve 48 is typically biased toward the latch retaining position by springs 56, 58 (see FIG. 11). A keyway 60 of the release sleeve 48 aligns with the key component 36 of the connector body 16 when slidingly mounted thereon.

The multi-fiber ferrule 38 can include an alignment pin 62 or a pair of alignment pins 62 that extend outward from the multi-fiber ferrule 38 to thereby engender the multi-fiber fiber optic connector 14 as a male fiber optic connector. The multi-fiber ferrule 38 can also include a pin hole or a pair of the pin holes and thereby engender the multi-fiber fiber optic connector 14 as a female fiber optic connector. The multi-fiber ferrule 38 can also include one alignment pin 62 and one pin hole and thereby engender the multi-fiber fiber optic connector 14 as a hermaphroditic fiber optic connector.

The multi-fiber fiber optic connector 14 includes a plurality of optical fibers 64 (see FIG. 15) that extend through respective bore openings 46 such that end portions 66 of the plurality of optical fibers 64 are positioned at the distal end face 44 of the multi-fiber ferrule 38.

In certain examples, the multi-fiber fiber optic connector 14 includes a boot 68 coupled to the rear end 28 of the connector body 16. The boot 68 provides bend protection to the plurality of optical fibers 64.

Turning to FIGS. 5-10, the dust cap 12 includes a main body 70 that forms a sleeve 72. The sleeve 72 includes a plurality of walls 74 that define two major sides 76a, 76b and two minor sides 78a, 78b. The plurality of walls 74 of the sleeve 72 together define a receptacle 80 having an open end 82 and an opposite, closed end 84 (see FIG. 14). The distal end face 44 of the multi-fiber ferrule 38 can be received within the receptacle 80 such that the closed end 84 of the receptacle 80 opposes the end portions 66 of the plurality of optical fibers 64.

Figure 13:
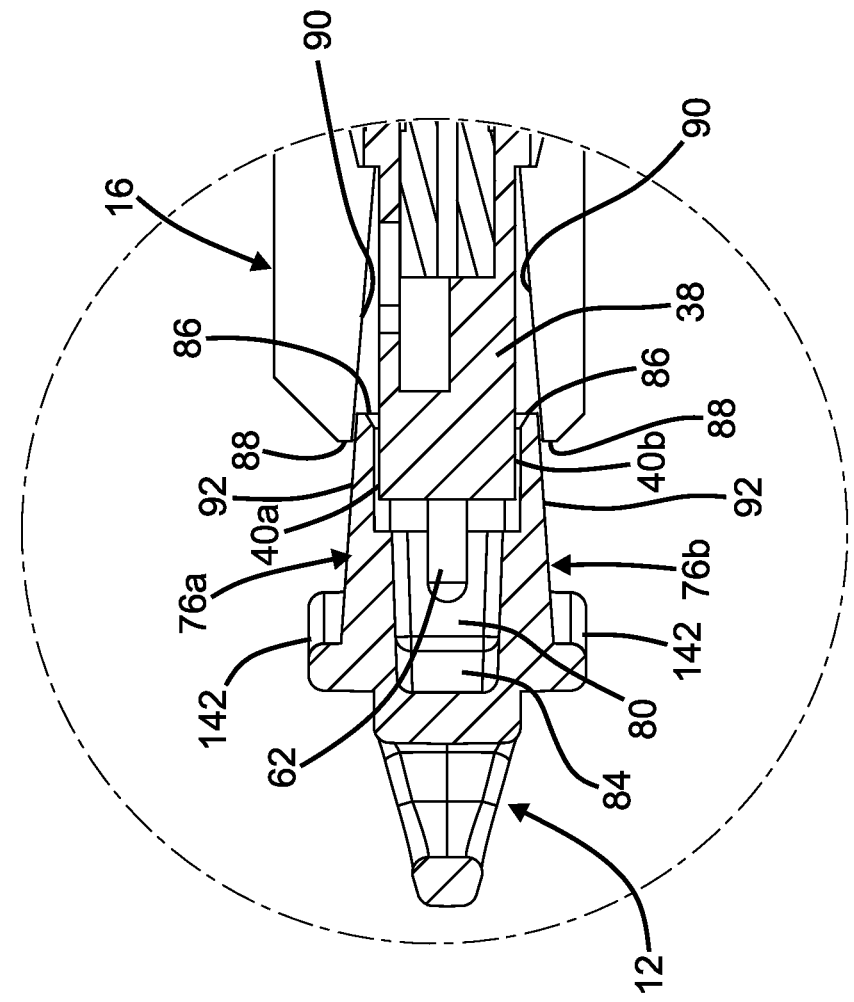
FIG. 13 illustrates an enlarged view of a portion of FIG. 12.

Referring to FIGS. 11-13, when the dust cap 12 is installed on the multi-fiber fiber optic connector 14, the sleeve 72 engages the front end 26 of the connector body 16 such that the plurality of walls 74 of the sleeve 72 mounts between the connector body 16 and the multi-fiber ferrule 38. That is, proximal ends 86 of the plurality of walls 74 of the sleeve 72 can engage a distal end 88 of the connector body 16 such that the sleeve 72 mounts between the connector body 16 and the multi-fiber ferrule 38.

When the dust cap 12 is installed on the multi-fiber fiber optic connector 14, the two major sides 76a, 76b of the sleeve 72 can engage the two major sides 40a, 40b of the multi-fiber ferrule 38 and the two minor sides 78a, 78b of the sleeve 72 can engage the two minor sides 42a, 42b of the multi-fiber ferrule 38. As such, no portion of the sleeve 72 of the dust cap 12 covers the first and second major sides 18, 20 of the connector body 16. Instead, proximal end portions of the sleeve 72 fit inside the distal end portion 88 of the connector body 16. The sleeve 72 mounts over the perimeter of the multi-fiber ferrule 38 between the connector body 16 and the multi-fiber ferrule 38 such that the receptacle 80 is positioned over the distal end face 44 of the multi-fiber ferrule 38 to thereby protect the distal end face 44 of the multi-fiber ferrule 38, the end portions 66 of the plurality of optical fibers 64, and the alignment pins 62.

Figure 14:
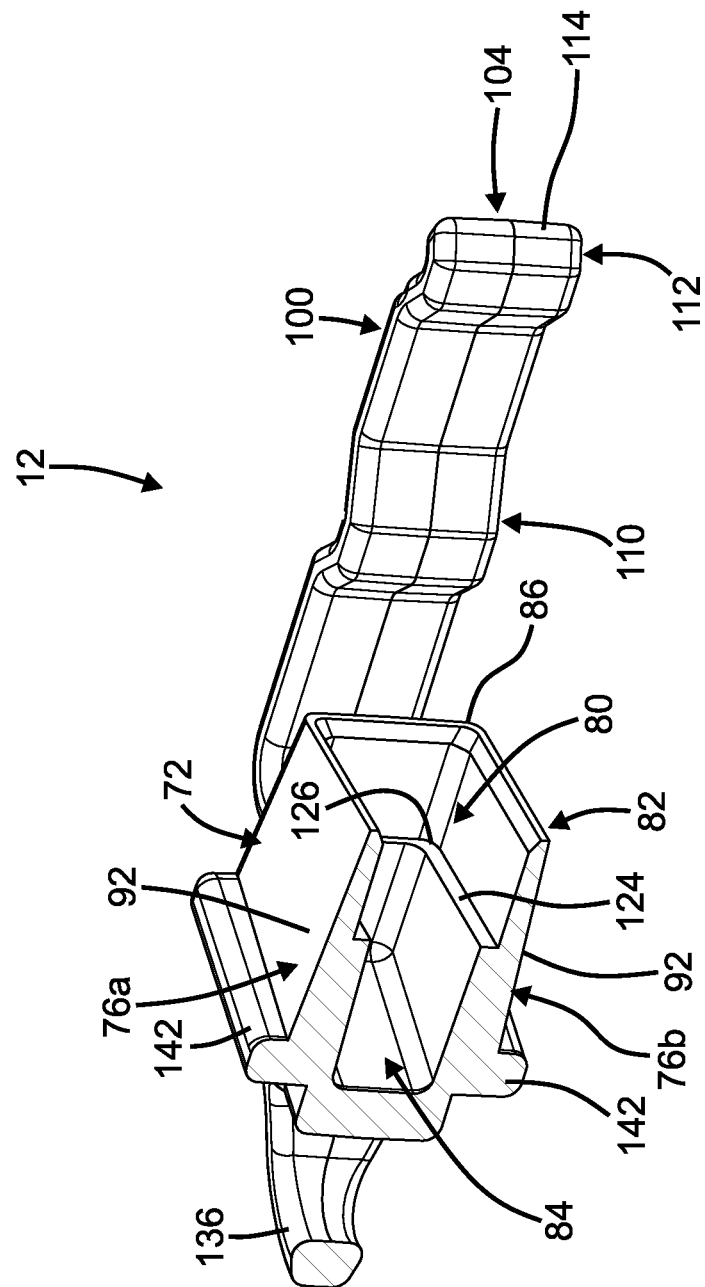
FIG. 14 illustrates a perspective view of the dust cap of FIG. 1 with half of the dust cap cut away.

Turning to FIGS. 13 and 14, the first and second major sides 18, 20 of the connector body 16 can each define tapered inner surfaces 90 that are configured to nest against outer tapered surfaces 92 of the two major sides 76a, 76b of the sleeve 72 when the dust cap 12 is installed on the multi-fiber fiber optic connector 14. The outer tapered surfaces 92 of the two major sides 76a, 76b of the dust cap 12 taper inwardly in a direction extending away from the closed end 84 of the receptacle 80 of the sleeve 72.

Figure 16:
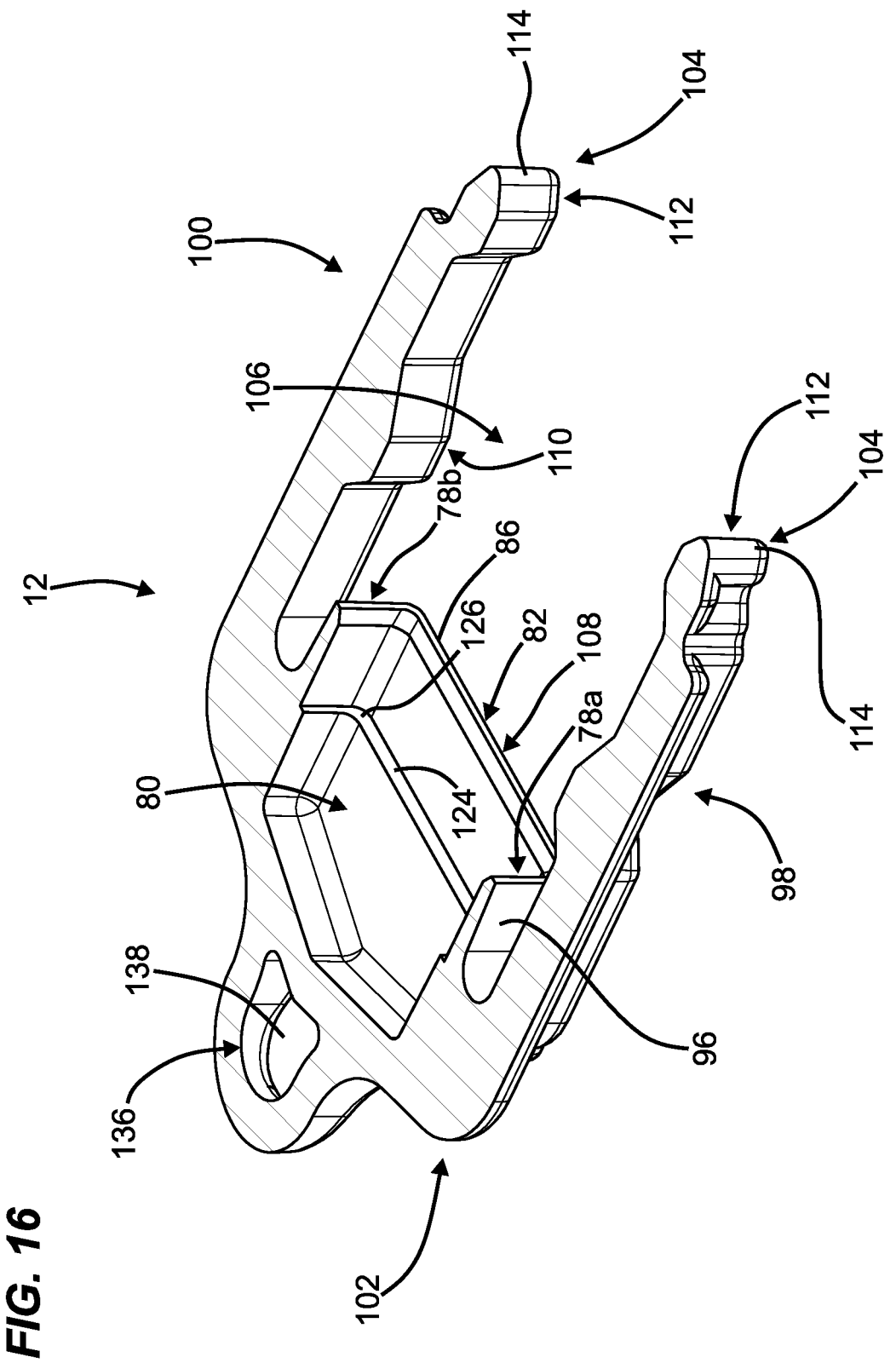
FIG. 16 illustrates a cross-sectional view of the dust cap of FIG. 1.

Referring to FIGS. 15 and 16, the first and second minor sides 22, 24 of the connector body 16 can also have a tapered inner surface 94 and the two minor sides 78a, 78b of the sleeve 72 can have a tapered outer surface 96 for mating with the tapered inner surface 94 of the first and second minor sides 22, 24 of the connector body 16 when the sleeve 72 is mounted between the connector body 16 and the multi-fiber ferrule 38.

As the dust cap 12 is pushed over the distal end face 44 of the multi-fiber ferrule 38, the outer tapered surfaces 92 of the two major sides 76a, 76b of the sleeve 72 slide against the tapered surfaces 90 of the first and second major sides 18, 20 of the connector body 16 and the tapered outer surface 96 of the two minor sides 78a, 78b of the sleeve 72 slide against the tapered inner surface 94 of the first and second minor sides 22, 24 of the connector body 16. As such, the dust cap 12 can be moved between the connector body 16 and the multi-fiber ferrule 38 and thereby squeeze down over the multi-fiber ferrule 38 to provide a seal thereabout. That is, the dust cap 12 can be fitted over the multi-fiber ferrule 38 with enough tolerances to provide a tight fit and seal. In certain examples, the dust cap 12 is mounted to press-fit over the multi-fiber ferrule 38. In certain examples, the dust cap 12 is mounted to slip-fit over the multi-fiber ferrule 38. It will be appreciated that other configurations may be used to ensure the dust cap 12 is fitted over the multi-fiber ferrule 38 to provide a seal.

Turning again to FIGS. 7-10, the dust cap 12 can include a first latching arm 98 and a second latching arm 100. The first and second latching arms 98, 100 can be respectively integrated with the sleeve 72 on the two minor sides 78a, 78b thereof. The first and second latching arms 98, 100 can each extend in a direction predominantly from a distal end 102 of the main body 70 of the dust cap 12 to a free end 104 of the first and second latching arms 98, 100.

In certain examples, the first and second latching arms 98, 100 can extend beyond the open end 82 of the sleeve 72 in a proximal direction to define an open region 106. That is, the open region 106 can define open sides of the dust cap 12 between the first and second latching arms 98, 100 that extend from a proximal end 108 of the sleeve 72 to the free ends 104 of the first and second latching arms 98, 100. Because the dust cap 12 defines the open region 106, when the dust cap 12 is installed on the multi-fiber fiber optic connector 14, no portion of the sleeve 72 mounts over or covers the first and second major sides 18, 20 of the connector body 16.

The first and second latching arms 98, 100 can each include a stabilizing projection 110 and a latching projection 112. The stabilizing projection 110 can be configured to respectively engage the main recesses 32 on the first and second minor sides 22, 24 of the connector body 16 when the dust cap 12 is installed on the multi-fiber fiber optic connector 14. That is, when the dust cap 12 is installed on the multi-fiber fiber optic connector 14, the first and second latching arms 98, 100 extend along the first and second minor sides 22, 24 of the connector body 16 such that the stabilizing projections 110 engage the main recesses 32 of the connector body 16. The stabilizing projections 110 may help to stabilize the dust cap 12 on the multi-fiber fiber optic connector 14 and provide alignment when installing the dust cap 12 on the multi-fiber fiber optic connector 14.

Referring to FIGS. 16-17, the first and second latching arms 98, 100 can extend along the first and second minor sides 22, 24 of the connector body 16 such that the latching projections 112 engage (e.g., fit within) the latching recesses 30 of the connector body 16 when the dust cap 12 is installed on the multi-fiber fiber optic connector 14. In certain examples, the open region 106 defined between the first and second latching arms 98, 100 of the dust cap 12 can extend from the proximal end 108 of the sleeve 72 to a proximal end 114 of the latching projection 112.

When the dust cap 12 is installed on the multi-fiber fiber optic connector 14, the latching projection 112 is configured to make a snap-fit connection with the connector body 16. During installation of the dust cap 12, the first and second latching arms 98, 100 can extend along the first and second minor sides 22, 24 of the connector body 16 such that the proximal end 114 of the latching projection 112 engages the projecting snap-fastening catch 34. The projecting snap-fastening catch 34 includes a first ramp 116 and a second ramp 118. When the dust cap 12 is mounted to the multi-fiber fiber optic connector 14, the proximal ends 114 of the latching projections 112 of the first and second latching arms 98, 100 can slide against the first ramp 116 of the projecting snap-fastening catch 34 and thereby flex the first and second latching arms 98, 100 away from a central axis A (see FIG. 7) of the dust cap 12. Continued proximal movement of the dust cap 12 over the multi-fiber ferrule 38 results in the proximal ends 114 of the latching projections 112 moving the release sleeve 48 in a proximal direction 120. As the latching projections 112 move over the projecting snap-fastening catch 34 and along the second ramp 118, the release sleeve 48 can be moved to the latch releasing position. While the release sleeve 48 is in the latch releasing position, the proximal ends 114 of the latching projections 112 can engage the latching recesses 30 to be positioned therein and the first and second latching arms 98, 100 can flex back toward the central axis A.

Once the latching projections 112 of the first and second latching arms 98, 100 are positioned in the latching recesses 30 of the connector body 16, the springs 56, 58 of the multi-fiber fiber optic connector 14 can urge the release sleeve 48 in a distal direction 122 to the latch retaining position. While the release sleeve 48 is in the latch retaining position, the release sleeve 48 can prevent the dust cap 12 from being distally pulled or otherwise removed from the multi-fiber ferrule 38 of the multi-fiber fiber optic connector 14.

In certain examples, the latch retaining position of the release sleeve 48 can also be defined when first end 50 of the release sleeve 48 abuts a stop surface 124 of a shoulder 126 of the dust cap 12. When the release sleeve 48 is in the latch retaining position and the latching projections 112 are positioned in latching recesses 30, the interior surface 128 (i.e., a trapping surface) (see FIG. 2) of the release sleeve 48 captures the latching projections 112 by covering a keeper surface 130 of the latching projections 112 to prevent the latching projections 112 from flexing outwardly away from the central axis A. In this way, the latching projections 112 are prevented from flexing over the catches 34 and interference between the catches 34 and the ramp surfaces 118 of the latching projections 112 prevent the dust cap 12 from being pulled forwardly from the multi-fiber fiber optic connector 14. The dust cap 12 is thereby secured to the multi-fiber fiber optic connector 14 at an installed position when the latching projections 112 are trapped between the release sleeve 48 and the connector body 16.

In certain examples, when the dust cap 12 is installed on the multi-fiber fiber optic connector 14, inclined surfaces 131 of the latching projections 112 can engage and move along the first ramp 116 of the projecting snap-fastening catch 34. In certain examples, the installed position of the dust cap 12 can be determined by a declined surface 132 seating against the second ramp 118 of the projecting snap-fastening catch 34. As a tapered seat 134 is formed in the latching recesses 30 at least in part by the second ramp 118, latching projections 112, and thereby the dust cap 12, can be located with precision and repeatability on the multi-fiber fiber optic connector 14. In certain examples, the declined surface 132 of the latching projections 112 match the tapered seat 134 of the latching recesses 30.

To remove the dust cap 12 from the multi-fiber fiber optic connector 14, the release sleeve 48 can be moved proximally to the latch releasing position while the dust cap 12 is urged in the distal direction 122. The interior surface 128 of the release sleeve 48 can be moved off the keeper surface 130 of the latching projections 112 when the release sleeve 48 is at the latch releasing position. Urging the dust cap 12 in the distal direction 122 flexes the latching projections 112 away from the central axis A. In certain examples, the latching projections 112 can be flexed away from the central axis A by the declined surface 132 of the latching projections 112 engaging the second ramp 118 of the latching projections 112 of the multi-fiber fiber optic connector 14. The latching projections 112 of the first and second latching arms 98, 100 is thereby removed from the latching recesses 30 and the dust cap 12 can be freely removed from the multi-fiber fiber optic connector 14.

Turning to FIGS. 19-20, the dust cap 12 may also include a pulling eye 136 positioned on the main body 70 of the sleeve 72 adjacent the closed end 84. In certain examples, the pulling eye 126 may be integrated with the sleeve 72 of the dust cap 12. The pulling eye 136 may define an opening 138 (see FIG. 15) for receiving a pulling strap 140a or a lanyard strap 140b. The lanyard strap 140b can also be used to secure the dust cap 12 to the multi-fiber fiber optic connector 14 by having the lanyard strap 140b also attached to the boot 68. The pulling strap 140a can be used to pull the multi-fiber fiber optic connector 14 through conduit bends, elbows and other conduit fittings or to pull the multi-fiber fiber optic connector 14 into position.

In certain examples, the dust cap 12 may also include a flange 142 (e.g., a grip component) provided on the two major sides 76a, 76b of the sleeve 72. The flange 142 may be used to assists in gripping the dust cap 12 during removal from the multi-fiber fiber optic connector 14. In certain examples, the flange 142 may be formed integral with the dust cap 12.

The dust cap 12 can be unitary in construction. The dust cap 12 can be molded from a plastic material. The dust cap 12 can be molded as a single piece. The example dust cap 12 can be made from a material that dissipates static electricity and thereby avoids electro-statically attracting contamination. The example dust cap 12 can be made from a material that does not outgas and thereby does not cause or contribute to contamination by out-gassing. The example dust cap 12 can be made from a rigid material and thus resist deforming under applied loads. In one embodiment, the dust cap 12 is made from a polypropylene material, although alternatives are possible.

From the forgoing detailed description, it will be evident that modifications and variations can be made without departing from the spirit and scope of the disclosure.

What is claimed is:

1. A multi-fiber fiber optic connector assembly comprising:

a multi-fiber fiber optic connector having a connector body with first and second major sides, first and second minor sides, a front end, and a rear end, wherein the first and second minor sides each define a latching recess, a main recess, and a projecting snap-fastening catch positioned between the latching recess and the main recess, and wherein at least one of the first and second major sides of the connector body includes a key component;

a multi-fiber ferrule positioned at the front end of the connector body, the multi-fiber ferrule having two major sides, two minor sides, and a distal end face, the multi-fiber ferrule defining a plurality of bore openings through the distal end face;

a plurality of optical fibers extending through respective bore openings such that end portions of the plurality of optical fibers are positioned at the distal end face of the multi-fiber ferrule;

a release jacket slidingly mounted over the connector body, the release jacket being slidable between a latch retaining position and a latch releasing position on the connector body; and a dust cap including:

a main body that forms a sleeve, the sleeve including a plurality of walls that define two major sides and two minor sides, wherein, when the dust cap is installed on the multi-fiber fiber optic connector, the sleeve is configured to mount between the connector body and the multi-fiber ferrule such that the two major sides of the sleeve engage the two major sides of the multi-fiber ferrule and the two minor sides of the sleeve engage the two minor sides of the multi-fiber ferrule; and first and second latching arms respectively integrated with the sleeve on the two minor sides thereof, the first and second latching arms each including a latching projection, wherein, when the dust cap is installed on the multi-fiber fiber optic connector, the first and second latching arms extend along the first and second minor sides of the connector body such that the latching projections engage the latching recesses on the connector body, and wherein the first and second latching arms together define an open region that is defined between the first and second latching arms from a proximal end of the sleeve to a proximal end of the latching projection such that when the dust cap is installed on the multi-fiber fiber optic connector, no portion of the dust cap covers the first major side of the connector body and no portion of the dust cap covers the second major side of the connector body.

2. The multi-fiber fiber optic connector assembly of claim 1, wherein the first and second minor sides of the connector body have a tapered inner surface and the two minor sides of the sleeve have a tapered outer surface for mating with the tapered inner surface of the first and second minor sides of the connector body when the sleeve is mounted between the connector body and the multi-fiber ferrule.

3. The multi-fiber fiber optic connector assembly of claim 1, wherein the first and second latching arms each include a stabilizing projection configured to respectively engage the main recesses of the first and second minor sides of the connector body when the dust cap is installed on the multi-fiber fiber optic connector.

4. The multi-fiber fiber optic connector assembly of claim 1, wherein the latching projections are configured to make a snap-fit connection with the connector body, and wherein when the release jacket is in the latch retaining position, the dust cap is prevented from being removed from the multi-fiber fiber optic connector.

5. The multi-fiber fiber optic connector assembly of claim 1, wherein the plurality of walls of the sleeve together define a receptacle having an open end and an opposite, closed end.

6. The multi-fiber fiber optic connector assembly of claim 5, wherein the distal end face of the multi-fiber ferrule is received within the receptacle such that the closed end of the receptacle opposes the end portions of the plurality of optical fibers.

7. The multi-fiber fiber optic connector assembly of claim 5, wherein the first and second major sides of the connector body define tapered inner surfaces configured to nest against outer tapered surfaces of the two major sides of the sleeve when the dust cap is installed on the multi-fiber fiber optic connector to be fitted over the multi-fiber ferrule.

8. The multi-fiber fiber optic connector assembly of claim 7, wherein the outer tapered surfaces of the two major sides of the sleeve taper inwardly in a direction extending away from the closed end of the receptacle.

9. The multi-fiber fiber optic connector assembly of claim 1, further comprising a pulling eye integrated with the sleeve of the dust cap.

10. The multi-fiber fiber optic connector assembly of claim 1, wherein a grip component is provided on the two major sides of the sleeve to assist in gripping the dust cap during removal.

11. The multi-fiber fiber optic connector assembly of claim 1, further comprising a boot coupled to the rear end of the connector body.

12. A dust cap and a multi-fiber fiber optic connector comprising:

a connector body including first and second major sides and first and second minor sides, wherein the first and second minor sides each define a latching recess, a main recess, and a projecting snap-fastening catch positioned between the latching recess and the main recess, and wherein at least one of the first and second major sides of the connector body includes a key component;

a multi-fiber ferrule mounted within the connector body, the multi-fiber ferrule having two major sides and two minor sides; and the dust cap including:

a sleeve including two major sides and two minor sides, wherein, when the dust cap is installed on the multi-fiber fiber optic connector, the sleeve is configured to mount between the connector body and the multi-fiber ferrule such that the two major sides of the sleeve engage the two major sides of the multi-fiber ferrule and the two minor sides of the sleeve engage the two minor sides of the multi-fiber ferrule; and first and second latching arms respectively integrated with the sleeve on the two minor sides thereof, the first and second latching arms each including a latching projection, wherein, when the dust cap is installed on the multi-fiber fiber optic connector, the first and second latching arms extend along the first and second minor sides of the connector body such that the latching projections engage the latching recesses on the connector body, and wherein the first and second latching arms together define an open region that is defined between the first and second latching arms from a proximal end of the sleeve to a proximal end of the latching projection such that when the dust cap is installed on the multi-fiber fiber optic connector, no portion of the dust cap covers the first major side of the connector body and no portion of the dust cap covers the second major side of the connector body.

13. The dust cap and the multi-fiber fiber optic connector of claim 12, wherein the first and second minor sides of the connector body have a tapered inner surface and the two minor sides of the sleeve have a tapered outer surface for mating with the tapered inner surface of the first and second minor sides of the connector body when the sleeve is mounted between the connector body and the multi-fiber ferrule.

14. The dust cap and the multi-fiber fiber optic connector of claim 12, wherein the first and second latching arms each include a stabilizing projection configured to respectively engage the main recesses of the first and second minor sides of the connector body when the dust cap is installed on the multi-fiber fiber optic connector.

15. The dust cap and the multi-fiber fiber optic connector of claim 12, further comprising a release jacket slidingly mounted over the connector body, wherein when the release jacket is in a latch retaining position, the dust cap is prevented from being removed from the multi-fiber fiber optic connector.

16. The dust cap and the multi-fiber fiber optic connector of claim 12, wherein the first and second major sides of the connector body define tapered inner surfaces configured to nest against outer tapered surfaces of the two major sides of the sleeve when the dust cap is installed on the multi-fiber fiber optic connector to be fitted over the multi-fiber ferrule.

17. The dust cap and the multi-fiber fiber optic connector of claim 12, further comprising a pulling eye integrated with the sleeve of the dust cap.

18. The dust cap and the multi-fiber fiber optic connector of claim 12, wherein a grip component is provided on the two major sides of the sleeve to assists in gripping the dust cap during removal.

19. The dust cap and the multi-fiber fiber optic connector of claim 12, further comprising a boot coupled to a rear end of the connector body.

20. The dust cap and the multi-fiber fiber optic connector of claim 12, wherein the sleeve defines a receptacle having an open end and an opposite, closed end, wherein a distal end face of the multi-fiber ferrule is received within the open end of the receptacle.

\* \* \* \* \*